J. E. HEATH.
HARVESTER.
No. 7,020.                                    Patented Jan. 15, 1850.
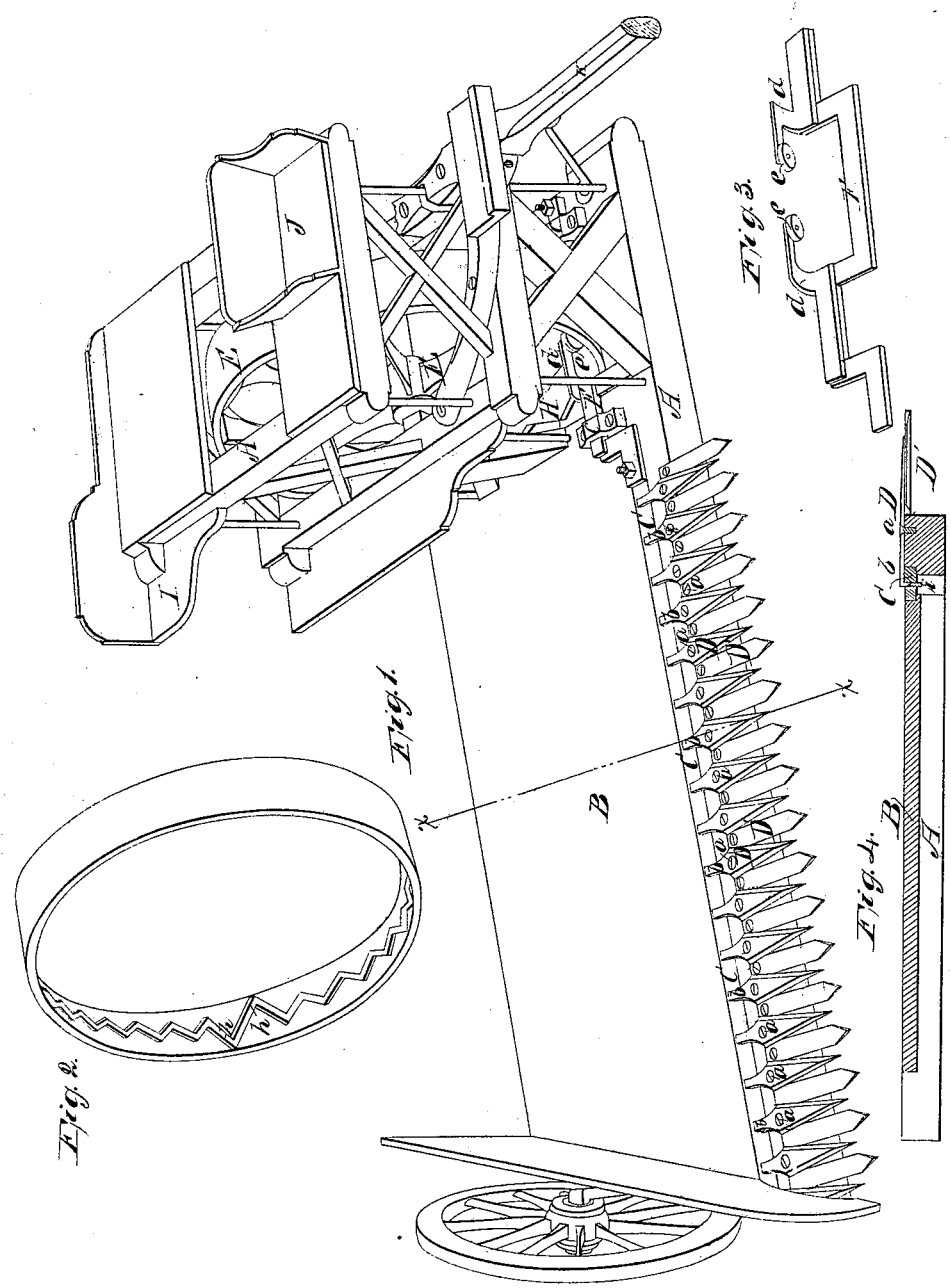

UNITED STATES PATENT OFFICE.

JOHN E. HEATH, OF WARREN, OHIO.

IMPROVEMENT IN HARVESTING-MACHINES.

Specification forming part of Letters Patent No. 7,020, dated January 15, 1850.

*To all whom it may concern:*

Be it known that I, JOHN E. HEATH, of Warren, in the county of Trumbull and State of Ohio, have invented certain new and useful Improvements in Harvesting-Machines, of which the following is a full, clear, and exact description, reference being had to the accompanying drawings, which form part of this specification, and in which—

Figure 1 is a view in perspective of my machine. Fig. 2 is a perspective view of the felly of the driving-wheel. Fig. 3 is a perspective view of the arrangement for operating the cutters, and Fig. 4 is a section through the platform at the line $x\,x$ of Fig. 1.

My invention consists, first, in so arranging the cutters, which in my machine act like shear-blades, that they can be set closer to each other as they wear, and, second, in the peculiar motion given to them, by which they are freed from the gum and dirt which accumulates upon their blades.

My machine is essentially composed of a strong frame, A, suitably braced, running upon two wheels, which embrace between them a platform, B, which receives the cut grain or grass, and to whose front edge the cutters are secured. These cutters are composed of two series of blades, D D', the lower, D', being stationary and projecting forward into the standing grain, and the upper, D, vibrating above the lower. The upper or moving blades have a triangular form, each being pivoted at the center $a$ of its base, midway between the bases of the stationary cutters, and having its point projecting forward. A shank, $b$, is formed at the base of each moving cutter, which projects backward from the pivot $a$, and is pivoted to a reciprocating bar, C, common to the whole series. This bar extends the whole breadth of the platform B, and receives a reciprocating motion from one, E, of the wheels on which the machine is supported through the following device: A short bar, F, is attached to the bar C, and is supported in slides $c\,c$ on the frame of the machine, immediately in front of the wheel E. From this bar two arms, $d\,d$, are projected inward toward the axle of the driving-wheel E. These arms are bent toward each other, so as to embrace the rim, and have each a friction-wheel, $e\,e$, attached to their projecting extremities, which run upon the opposite sides of a zigzag cam, H, secured to the inner periphery of the rim of the driving-wheel E. As then the machine is drawn forward the zigzag cam, acting upon the friction-wheels, communicates a reciprocating motion to the bar C, which, acting upon the shanks of the moving cutters, causes the opposite cutting-edges to vibrate alternately over those of the stationary cutters adjoining them. As each cutter is sharpened on both its edges, these act alternately upon the grain included between them in the forward motion of the machine in the same manner as the blades of a shear. The cut grain falls upon the platform B and is raked off by a workman, for whom a seat, I, is provided on the frame-work of the driving-wheel. As the cutters wear it is necessary that they should be set closer to each other. This is accomplished by bending the extremity of each shank downward and making it the pivot which connects the shank with the reciprocating bar C. The end of this pivot does not pass through the bar, but rests upon a set-screw, $i$, entered through the lower side of the bar. As the cutting-edges wear away this screw is set up by applying a screw-driver or a wrench to the head through an opening made for the purpose in the frame. The shank being thus raised forces the opposite or front extremity of the moving cutter down upon the stationary cutter, thus keeping the cutting-edges of the moving and fixed cutters in their proper positions with respect to each other.

This device, by means of which any one cutter may be adjusted independently of the others, is of great practical advantage, for the wear is so unequal that if the whole series are adjusted at one operation some of them would be set too tight, while others would be set too loose to act efficiently upon the grain.

In order to cleanse the cutters from the gum and dirt which is continually accumulating upon them, the zigzag cam H is not made uniform throughout its whole extent; but, on the contrary, two of its indentations, $h\,h$, are made larger than the others, so that when these in their turn act upon the friction-wheels $e$ the moving cutters receive a much greater vibration, which detaches the mass of dirt and gum from them.

A progressive motion is given to the machine by a team hitched to a pole, K, extending from the main frame, and a seat, J, and foot-board are provided for the driver.

What I claim in the foregoing as my invention, and desire to secure by Letters Patent, is—

The method of cleansing the cutters by giving them at suitable intervals a larger vibration than ordinary, substantially in the manner herein set forth, thus detaching the dirt and gum which accumulates upon them.

In testimony whereof I have hereto subscribed my name.

J. E. HEATH.

Witnesses:
P. H. WATSON,
ELI K. WISELL.